(12) United States Patent
Mohler

(10) Patent No.: US 6,507,257 B2
(45) Date of Patent: Jan. 14, 2003

(54) PERMANENT MAGNET BRUSHLESS TORQUE LATCHING ACTUATOR

(75) Inventor: David B. Mohler, Tipp City, OH (US)

(73) Assignee: SAIA-Burgess Inc., Vandalia, OH (US)

( * ) Notice: Subject to any disclaimer, the term of this patent is extended or adjusted under 35 U.S.C. 154(b) by 39 days.

(21) Appl. No.: 09/820,641

(22) Filed: Mar. 30, 2001

(65) Prior Publication Data

US 2001/0030479 A1 Oct. 18, 2001

(30) Foreign Application Priority Data

Mar. 31, 2000 (GB) .............................................. 0007743

(51) Int. Cl.⁷ ................................................. H01F 7/08
(52) U.S. Cl. ....................... 335/220; 335/272; 335/279; 335/229; 310/36
(58) Field of Search ............................ 310/36; 335/272, 335/279, 220–229, 230, 231, 232, 239, 242–3

(56) References Cited

U.S. PATENT DOCUMENTS 2,930,974 A  * 3/1960 From ........................ 335/272
2,987,687 A  * 6/1961 Buchtenkirch et al. ..... 335/279
5,337,030 A  * 8/1994 Mohler ....................... 310/136

* cited by examiner

Primary Examiner—Lincoln Donovan
(74) Attorney, Agent, or Firm—Nixon & Vanderhye P.C.

(57) ABSTRACT

A bi-directional latching actuator is comprised of an output shaft with one or more rotors fixedly mounted thereon. The shaft and rotor are mounted for rotation in a magnetically conductive housing having a cylindrical coil mounted therein and is closed by conductive end caps. The end caps have stator pole pieces mounted thereon. In one embodiment, the rotor has at least two oppositely magnetized permanent magnets which are asymmetrically mounted, i.e., they are adjacent at one side and separated by a non-magnetic void on the other side. The stator pole piece has asymmetric flux conductivity and in one embodiment is axially thicker than the remaining portion of the pole piece. An abutment prevents the rotor from swinging to the neutral position (where the rotor magnets are axially aligned with the higher conductivity portion of the pole piece). Thus, the rotor is magnetically latched in one of two positions being drawn towards the neutral position. Energization of the coil with an opposite polarity current causes the rotor to rotate towards its opposite latching position whereupon it is magnetically latched in that position.

20 Claims, 3 Drawing Sheets

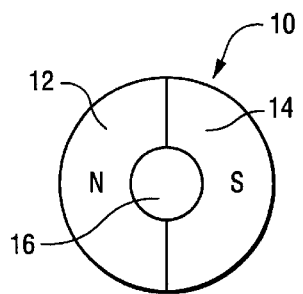
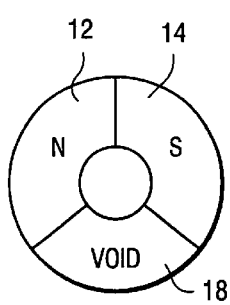
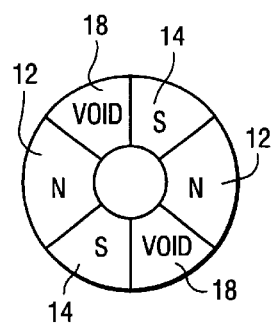
Fig. 1(a) (PRIOR ART)   Fig. 1(b)   Fig. 1(c)
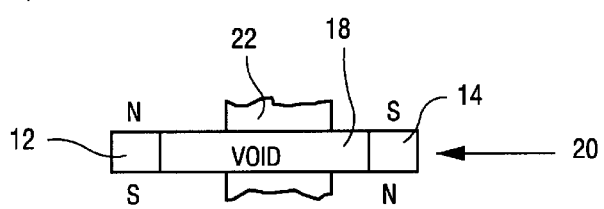
Fig. 1(d)
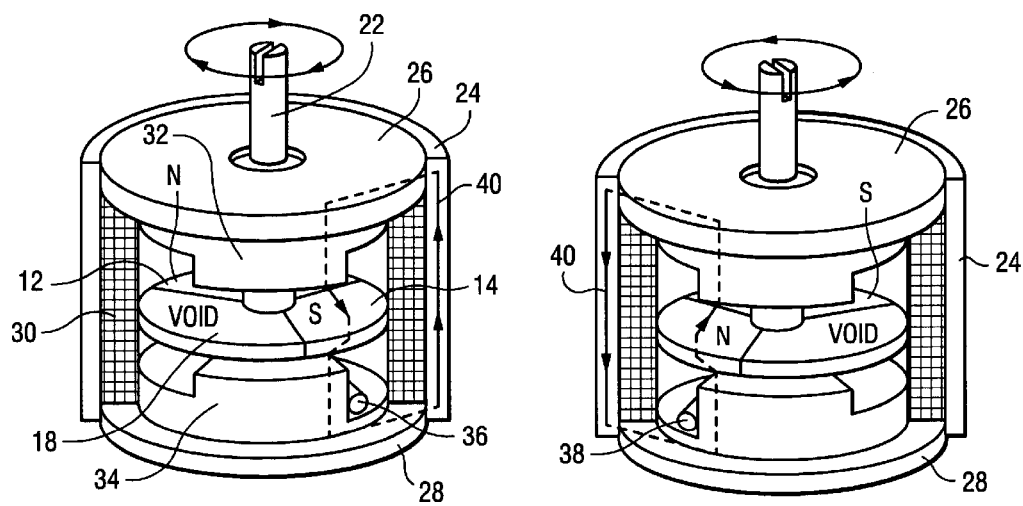
Fig. 2   Fig. 3

PERMANENT MAGNET BRUSHLESS TORQUE LATCHING ACTUATOR

BACKGROUND OF THE INVENTION

1. Field of the Invention

This invention relates to a latching permanent magnet brushless torque actuator (PMBTA) and particularly a bi-directional PMBTA capable of being latched in two different rotational positions and remaining in the latched positions even when the latching coil is de-energized.

2. Discussion of Prior Art

U.S. Pat. No. 5,337,030 was issued on Aug. 9, 1994 to David Mohler (the "Mohler patent"), an inventor of the present invention, and the subject matter is herein incorporated by reference in its entirety. The Mohler patent discloses a permanent magnet brushless torque actuator (PMBTA) having the stator assembly supporting the permanent magnet rotary assembly, the stator assembly including stator poles and an electromagnet winding and the rotor assembly including a rotor shaft supporting the rotor assembly for rotation about a rotational axis and a plurality of arcuate permanent magnet poles disposed around the rotor shaft in a north-south-north-south sequence. Energization of the electromagnet winding induces the stator poles as north and south poles which coact with the permanent magnet poles in the rotor to generate a torque rotating the rotor assembly relative to the stator assembly.

Although the rotor assembly of the PMBTA disclosed in U.S. Pat. No. 5,337,030 will reach an intermediate rest position when the electromagnet winding is de-energized (as aided by spring 70), when energized it reaches a rest position achieved when the magnetically induced clockwise torque balances the magnetically induced counter-clockwise torque (and any centering spring force). Thus variation of the coil current increases torque in one direction and decreases it in the other and the rotor moves until a new steady state position is reached. Unfortunately, when the coil is de-energized, with the centering spring, the energized position is not latched and the rotor returns, under the spring bias, to the centered position. Even without the centering spring, when de-energized, the rotor of the PMBTA because of the symmetrical pull between the magnets and the stator pole pieces there is little or no net torque and it reaches a neutral position only gradually (if at all), and can be disturbed from this position by relatively small outside magnetic influences.

Thus, it is desirable in certain application to have a bi-directional latching actuator which upon energization will go to one position and upon de-energization, remain latched in that position. Upon energization with the opposite polarity current, it is desirable for the latching actuator to move to the opposite position and, latch so that, upon de-energization, it remains latched in the new position.

SUMMARY OF THE INVENTION

It is an object of the present invention to provide a permanent magnet brushless torque latching (PMBTL) actuator having clockwise and counter-clockwise latched rest positions.

It is a further object of the present invention to provide a PMBTL actuator having clockwise and counter-clockwise latched positions to one of which the rotor assembly will return when the electromagnet winding of the actuator is de-energized.

In accordance with all embodiments of the present invention, there is provided a PMBTA comprising a rotor assembly supported for rotation relative to a stator assembly. The rotor assembly has a rotor shaft defining an axis of rotation and at least one rotor rotatable about the rotor axis with respect to stator assembly. At least one stator assembly is located axially above or below the rotor and, in preferred embodiments, sandwiches the rotor between two stator assemblies.

At least one electromagnet coil is provided such that, when energized, the coil generates a toroidal magnetic field having a flux component parallel to the rotor's axis of rotation and passing through the rotor and the at least one stator. The coil's electromagnetically induced field, when energized with the correct polarity of current, causes movement of the rotor to a latched position whereupon permanent magnets hold the rotor in that latched position when current through the coil is terminated. An abutment prevents the rotor from rotating such that the permanent magnets on one structure are axially aligned with the void on the other structure. A reverse current through the coil, unlatches the rotor and torques it into movement to the other latched position. In all embodiments, the flux field created by the winding aids the flux field through one of the permanent magnets and opposes the flux field through an opposing permanent magnet resulting in a torque applied to the rotor causing it to rotate until contacting a rotational stop.

In a first embodiment, the rotor is only partially comprised of at least two circumferentially spaced permanent magnets generating opposing magnetic flux fields, each field having a component in a direction parallel with the rotor's axis of rotation. The at least two permanent magnets are non-symmetrically disposed at differing circumferential positions around the rotor shaft with a non-magnetic or void area separating the opposing magnets at one circumferential position for each pair of opposing permanent magnets.

In this first embodiment, the stator assembly includes ferromagnetic stators providing a low resistance path for the flow of magnetic flux from said permanent magnets where the stators have one or more circumferentially defined portions whose flux conductivity is enhanced. Because of the void portion of the rotor, the rotor stays in its rotated position against the abutment stop due to the greater pull of one magnet on a corresponding enhanced conductivity portion of the stator and the lesser pull of the void and opposite polarity magnet with respect to a lesser conductivity portion of the stator assembly.

In a second embodiment, a stator has at least two circumferentially spaced permanent magnets generating opposing magnetic flux fields, each field having a component in a direction parallel with the rotor's axis of rotation. The at least two permanent magnets are disposed asymmetrically about the stator at differing circumferential positions around the rotor shaft with a non-magnetic or void area separating the opposing magnets at one circumferential position for each pair of opposing permanent magnets.

In the second embodiment, the rotor is comprised of at least one segment of ferromagnetic material with a corresponding segment of non-ferromagnetic material (or an absence of ferromagnetic material). Because of the void portion of the stator and/or the non-ferromagnetic portion of the rotor, the rotor stays in its rotated position against the stop due to the greater pull of one stator magnet on the ferromagnetic portion of the rotor and the lesser pull of the stator magnet. The proximity void on the stator insures that the magnetic pull on the rotor is not stable thereby pulling the ferromagnetic portion of the rotor into a latched position.

BRIEF DESCRIPTION OF THE DRAWINGS

The above and other advantages of the invention will become more apparent from the following description taken in conjunction with the accompanying drawings, wherein like references refer to like parts, wherein:

FIG. 1(a) is a top view of the permanent magnet polarities of the rotor in U.S. Pat. No. 5,337,030;

FIG. 1(b) is a top view of the arrangement for one of the rotor and stator of one set of the permanent magnet polarities and the void of a long throw, lower torque embodiment of the present invention;

FIG. 1(c) is a top view of the arrangement for one of the rotor and stator of two sets of the permanent magnet polarities and the voids of a shorter throw, greater torque embodiment of the present invention;

FIG. 1(d) is a side view of a rotor having the magnet characteristics shown in FIG. 1(b);

FIG. 2 is a perspective view, partially in section, of a first embodiment of the present invention latched in the clockwise direction;

FIG. 3 is a perspective view, partially in section, of a first embodiment of the present invention latched in the counter-clockwise direction;

BRIEF DESCRIPTION OF PREFERRED EMBODIMENTS

Figure 4:
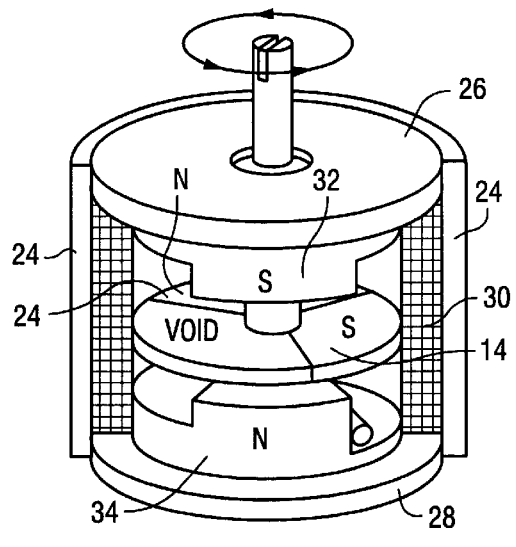
FIG. 4 is a perspective view, partially in section, of a first embodiment of the present invention latched in the clockwise direction but with an energization pulse applied to move it towards the counter-clockwise direction.

The present specification incorporates by reference the entire disclosure of British provisional application GB 0007743.8 filed Mar. 31, 2000, entitled "Torque Latcher."

FIG. 1 is a top view illustrating the orientation of magnets in the prior art rotor 10 according to the PMBTA of the Mohler patent noted above. There are two segments, one of which has a permanent magnet 12 oriented with the North pole on the top and the South pole on the bottom. From a review of the Mohler patent, it will be remembered that the angle and direction of rotation of the PMBTA depended upon the magnitude and direction of current flow through the energizing coil. In effect, one of the rotor permanent magnets was weakened and the other was strengthened by the toroidal flux generated by the energization coil. However, because the rotor magnets were equally strong and equally disposed around the periphery of the PMBTA ( i.e., the magnets are symmetrically placed around the periphery of the rotor), when the coil was de-energized, there was little or no residual magnetism in the stator and thus little or no net torque was present to latch the rotor in its previous energized position.

The present inventors have found that, if an asymmetrical magnet positioning is used (the effective center of the opposing magnets is not directly opposite each other), there is sufficient net torque to retain the rotor in the final position even after the coil energizing current has been terminated. This principle can be applied to embodiments in which, like the PMBTA, the magnets are located on the rotor, or embodiments in which the magnets are located on one or more stator pole pieces. One orientation of magnets and voids is shown in FIG. 1(b) in which a north magnet 12 is not directly opposite a south magnet 14 and a void 18 is inserted between the two opposing magnets at one side.

The rotor can be made of raw magnet material in which segments are magnetized in the desired directions and where the voids are simple unmagnitized areas. Such a homogeneous disk could be made of neodymium-iron-boron, ferrous ceramic, samarium cobalt, or other magnetizable material. Additionally, the rotor could be made of discrete magnet segments in which case the void could be air, plastic, or any other non-ferrous material.

A further embodiment of permanent magnet orientation is shown in FIG. 1(c) in which there are two sets of north/south magnets and void areas. FIG. 1(d) is a side view of a rotor 20 having the magnet distribution shown in FIG. 1(b) in which the preferred orientation of the magnets' field is parallel to the axis of the rotor shaft 22. It will be understood that throughout this application that if a magnet segment has a north pole on the upper face (of the rotor in a first embodiment or a stator in a second embodiment), it will have a south pole on the lower face.

Referring now to FIGS. 2–4, the latching actuator includes a hollow cylindrical housing 24 preferably formed from ferro-magnetic material. Opposite ends of the housing 24 are closed by respective annular, ferro-magnetic disks 26, 28 the central apertures of which receive bearings supporting rotor shaft 22. The actuator further includes at least one electromagnet coil 30 wound on a cylindrical former (not shown), the coil being disposed co-axially within the housing 24 and extending between the inwardly presented faces of the disks 26, 28.

Each of the disks 26, 28 includes, on its inwardly presented face, sector shaped stator pole pieces 32, 34, respectively. The stator pole pieces are ferromagnetic, and, in a preferred embodiment, are formed integrally with their respective disks 26, 28 and are axially aligned in the actuator. The stator pole pieces 32, 34 extend closer to the rotor 22 than the disks 26, 28 and thus serve to define a relatively low resistance path for flux flow parallel to the axis of rotation of the rotor shaft 22. It is noted that the variations in axial thickness of the stator pole pieces creates a circumferentially varying flux conductance and thus the magnets would be pulled towards the portion of the stator pole piece having the greatest conductance.

Secured to the rotor shaft 22 and disposed, in a preferred embodiment, midway between the pole pieces 32 and 34, is a rotor 20 having the permanent magnet orientation discussed above in conjunction with FIGS. 1(b) and 1(d). In this embodiment, the three sector-shaped regions each subtending an angle of 120.° Other non-uniform angles could be used depending upon whether one wishes the magnetic latching force to be more or less (the greater the void angle the greater the latching force for a given magnet/pole piece combination).

The first and second regions 12 and 14 are defined by permanent magnet material and constitute permanent magnet rotor poles. The permanent magnet 12 is polarized to present a magnetic north pole to the disk 26 and a magnetic south pole to the disc 28. The permanent magnet 14 is polarized in the opposite direction and thus presents a magnetic south pole to the disk 26 and a magnetic north pole to the disc 28. The third region described above as void 18 is formed from non-magnetic or un-magnetized material.

Two sets of abutments on the rotor shaft and/or on the stators operate to define the rotational limits of the angular movement of the rotor relative to the stator. One or more abutments defines a limit in the clockwise direction while another one or more abutments defines a limit in the counter clockwise direction. These abutments prevent the rotor from rotating to the position in which the magnets on the rotor overlie the region of greatest flux conductivity on the stator, from each rotational direction.

One abutment 36 fixed to the rotor shaft 22 is shown in FIG. 2 serving to define the limit of clockwise rotation of the rotor assembly relative to the stator assembly. FIG. 3 shows the rotor assembly rotated in a counter clockwise position from the position illustrated in FIG. 2, to its counter clockwise limit position defined by abutment 38. It can be seen (by reference to the position of the void 18) that between the clockwise and counter clockwise limit positions the rotor, in this embodiment, has a rotational freedom of approximately 100°.

FIG. 2 also illustrates the flux lines 40 generated by the permanent magnets in the rotor with the rotor latched in its clockwise limit position and the coil de-energized. Note that the flux lines from the magnet curve towards the thicker portions of the upper and lower stator pole pieces because the air gap is smaller and thus the resistance to flux flow is less in the ferro-magnetic material of which the pole pieces are made. This unbalanced deformation of the flux field generates a net torque on the rotor in the clockwise direction as shown by the arrows around the shaft 22 and further movement is prevented only by the abutment 36. FIG. 3 similarly shows the deformed flux lines which hold the rotor in the latched counter-clockwise position. In both cases the coil 30 is de-energized (and thus no polarity is indicated on the stator pole pieces).

In the clockwise limit position shown in FIG. 2, the radial juncture of the south magnet 14 and the void 18 of the rotor 20 is adjacent the counter clockwise boundaries of the stator poles 32, 34. At its counter clockwise rotational limit, the radial juncture of the north magnet 12 and the void 18 of the rotor 20 is adjacent the clockwise boundary of the stator poles 32, 34.

There is a mid-point in the range of rotational movement of the rotor in which an imaginary radial center line of the void 18 of the rotor disc lies in an axially extending, diametral plane containing the radial center lines of the stator poles 32, 34. It will be recognized that this central position is an unstable position from which the rotor would migrate in either clockwise or counter clockwise direction towards a rest position in which the torque effects on the rotor are balanced in the absence of the abutments limiting rotational movement.

However such a position cannot be reached since the abutments will limit the rotational movement of the rotor in each direction. It will be recognized therefore that the clockwise and counter clockwise limit positions of the rotor assembly can be said to be latched rest positions since they are rest positions in which the rotor assembly is maintained by the magnetically generally torque attempting to rotate the rotor assembly beyond the limit position defined by the abutment.

The above latched position can be thought of in FIG. 2 as the south magnet 14 being closer to the enhanced flux conductivity of the stator pole piece 34 than the north magnet. Because the attraction between a magnet and a ferrous pole piece is inversely proportional to the distance, the attraction of the south magnet 14 to the pole piece 34 is greater than the attraction between north magnet 12 and the pole piece 34, thereby maintaining the rotor in its last position, even though the coil 30 is de-energized.

In order to move the rotor assembly from a latched position, torque must be applied to the rotor in excess of and opposite to the magnetic holding torque at the limit position. FIG. 4 illustrates the effect of energizing the electromagnet coil 30 with a current of an appropriate polarity (inducing the magnetic polarity shown in the stator pole pieces) to rotate the rotor to the counter-clockwise position, but with the rotor in its starting clockwise limit position.

The upper stator pole piece 32 is electromagnetically induced to present a south pole face to the rotor (as shown by the "S" marking adjacent the face of the stator pole piece 32), while the lower stator pole piece 34 is electromagnetically induced to present a north pole face to the rotor (as shown by the "N" marking adjacent the face of the stator pole piece 34). Thus the magnetic polarities induced in the stator pole pieces oppose the adjacent polarities of the permanent magnets of the rotor. This opposition (the magnetic repulsion of south against south and north against north) produces a counter clockwise torque driving the rotor assembly in a counter clockwise direction from its clockwise latched position.

Simultaneously, the stator poles attract the opposite polarity permanent magnet poles with which they are, at this time, not overlapped (the south pole face of the upper pole piece 32 attracts the north pole 12 of the permanent magnet in the rotor and the north pole face of the lower pole piece 34 attracts the lower south polarity face on the bottom side of north magnet 12). This magnetic attraction also produces a counter-clockwise torque which assists the magnetic repulsion in providing the torque to drive the rotor assembly in a counter clockwise direction.

It will be recognized that the same effect, but with opposite polarities, occurs when the coil 30 is energized in the opposite polarity (or has the opposite winding direction) to drive the rotor assembly from its counter clockwise limit position towards its clockwise limit position.

It will be seen therefore that although the actuator has positively magnetically latched clockwise and counter clockwise rest positions, the rotor assembly of the actuator can be driven between those rest positions by appropriate polarity energization of the coil 30. Thus the rotor shaft 22 can be used as a bidirectional output shaft whereby the actuator can be used to drive some external mechanism.

It will be appreciated that the use of a pair of upper stator pole pieces and a pair of lower stator pole pieces and a rotor having the permanent magnet configuration shown in FIG. 1(*c*) and two areas of enhanced flux conductivity will also be operable, latching in both the clockwise and counter-clockwise limit positions. However, because there are two complete sets of magnets and voids distributed around the rotor's 360° (alternatively these could be on the stator) and two areas of enhanced flux conductivity on the stator (alternatively, these could be on the rotor), the operational rotational range of motion is about half that of the embodiments of FIGS. 2–4 having the magnet/void pattern disclosed in FIGS. 1(*b*) and 1(*d*).

Figure 5:
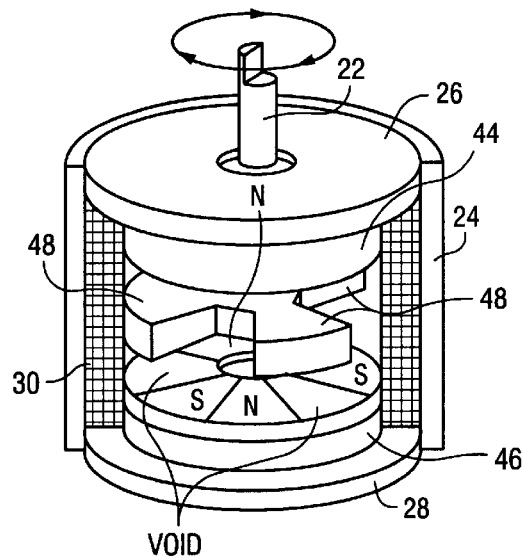
FIG. 5 is a perspective view, partially in section, of a second embodiment of the present invention latched in the clockwise direction.

However, the FIG. 1(*c*) embodiment would have a greater operating torque having twice the number of magnets interacting with twice the number of stator pole pieces. Thus arrangement of multiple sets of magnets and voids in the rotor or stator increases the torque at the expense of the arcuate length of travel. A two rotor version of a latching actuator in which the rotor has two sets of magnets and voids is shown in FIG. 6 and a single rotor with three sets of magnets and voids is shown in FIG. 5.

Figure 6:
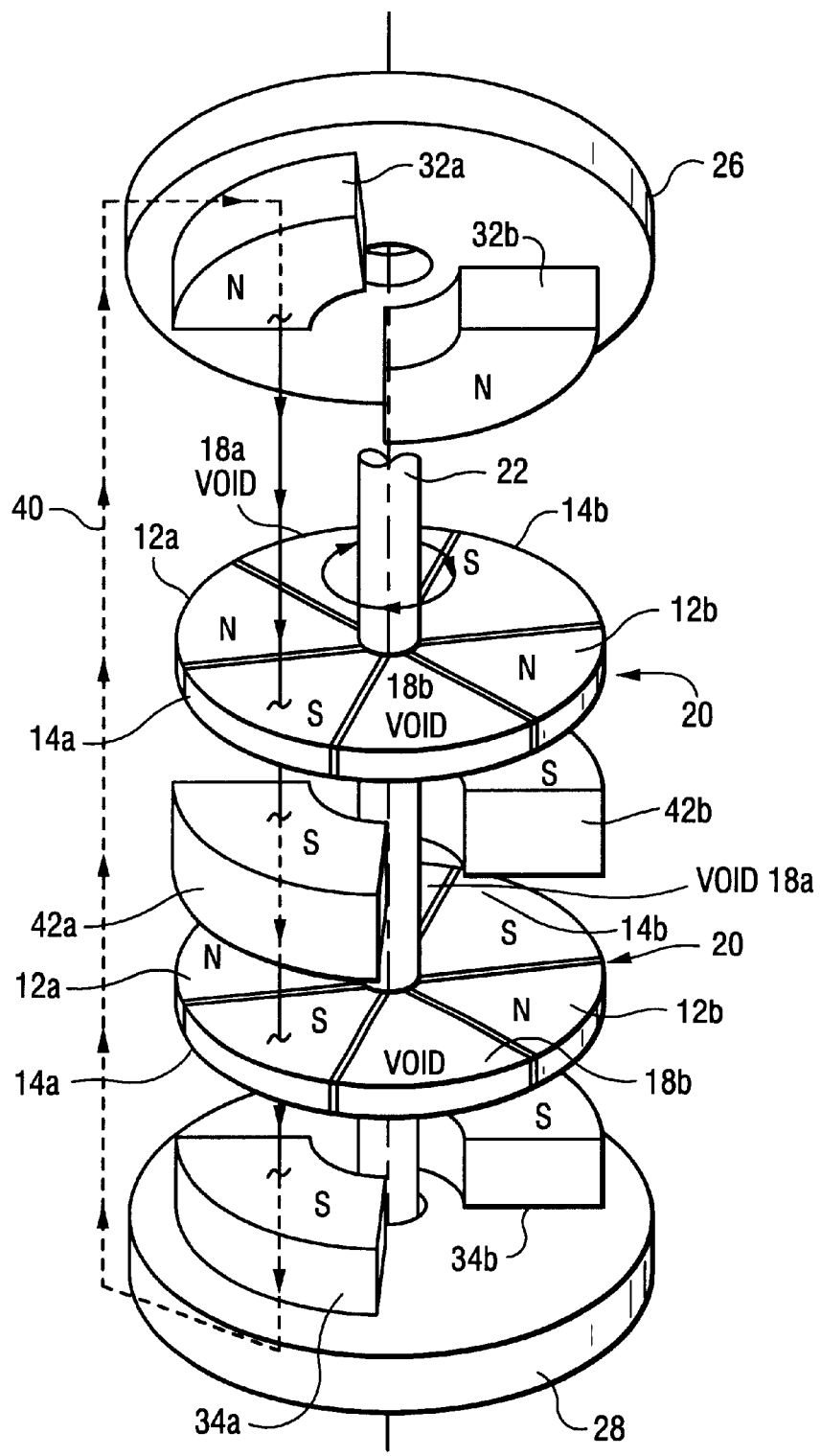
FIG. 6 is a partially exploded perspective view of a multi-rotor embodiment of the present invention.

FIG. 6 shows a modification which not only increases torque by having multiple sets of magnets and voids, but also has multiple rotors also increasing the actuating torque.

The basic latching actuator construction is as described above, but each disc 26, 28 carries two integral, diametrically opposed, sector shaped stator pole pieces 32a, 32b, and 34a, 34b, respectively. Each of two rotors 20 comprises six sector shaped regions having north face magnets 12a, 12b, south face magnets 14a, 14b, and voids 18a, 18b, each subtending an angle of 60°. The coil 30 for energizing the rotors to move from one latched position to the other as well as the abutments serving to limit rotational movement have been omitted for clarity.

Located between the rotors 20 are an intermediate pair of stator pole pieces 42a and 42b which are fixed to the inside of the coil's former. The intermediate stator pole pieces operate in precisely the same fashion as the upper and lower stator pole pieces.

Regions 12a, 12b of the two rotors 20 present magnetic north poles to the stator pole pieces located immediately thereabove and magnetic south poles to the stator pole pieces located immediately therebelow. Regions 14a, 14b present magnetic south poles to the stator pole pieces located immediately thereabove and magnetic north poles to the stator pole pieces located immediately therebelow.

The position of the magnet portions of the rotors and the stator pole pieces as shown in FIG. 6, indicate that the actuator is latched in the counter-clockwise position and the lines of flux 40 from the coil (not shown) indicate that the coil has been actuated to move the rotor to the clockwise position.

In either limit position, the effect of appropriate energization of the winding 30 is to induce magnetic polarities in the pole pieces 32a, 32b, 42a, 42b, and 34a, 34b which repel the overlapped rotor magnets 14a or 14b and attract the non-overlapped rotor magnets 12a, 12b, with sufficient force to generate enough torque to overcome the permanent magnet latching effect and move the rotor to its opposite limit position where it will remain as a result of permanent magnet latching after the coil 30 is de-energized.

It will be recognized that, if desired, further stator poles and corresponding sets of north, south and void rotor sectors could be provided, the rotating and latching torque could be increased but with a decrease in the angular distance between clockwise and counter clockwise limit positions (the "throw" of the actuator).

Figure 7:
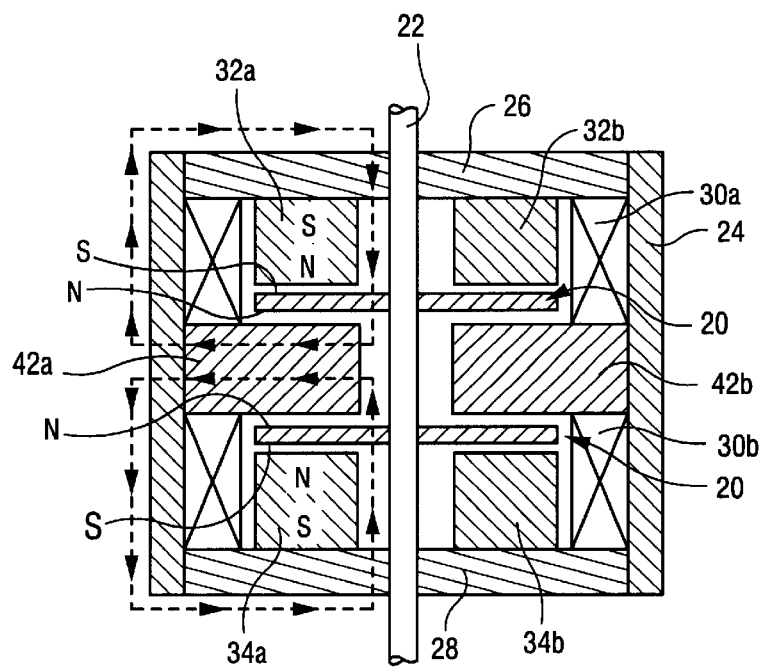
FIG. 7 is a side view, partially in section, of a dual coil embodiment of the present invention.

While the preferred embodiments of the latching actuator uses a single coil 30, multiple coils could be used to create the desired actuation torque. In the event that two or more coils are used, it is necessary that the torque on the output shaft from the various rotors adds so as to provide the necessary rotational torque. Generally, the coils and/or their supplied current is such that the flux flow is in the same toroidal direction. However, this is not required as shown, for example, in FIG. 7 which is a cross sectional side view illustrating an embodiment using two coils, 30a and 30b.

As shown, either the windings of the two coils are wound in the opposite directions or the current flow is applied in opposite directions because the flux flow path from each coil is opposite the other. In this case the polarity of the magnets would be reversed in one of the rotors in order that the torque supplied from each rotor to the output shaft adds rather than cancels each other. Such an embodiment might be useful for systems needing a redundant actuator, especially if each coil and rotor system generates sufficient rotational torque to operate the desired mechanism.

Thus, a first embodiment of the present invention uses permanent magnets in the rotor to generate a latching force keeping the rotor in its last energized position. However, in a second embodiment, the magnets could also be located in or adjacent one or more of the stators without departing from the present invention.

FIG. 5 illustrates a modification of the actuator described above in which the upper and lower stator pole pieces 44, 46 do not have sector shaped poles (in order to generate the variation in flux conductivity that causes the rotor magnet to bi-directionally latch in the FIGS. 2–4 embodiments). Instead a stator disk comprised of a plurality of permanent magnet sectors and non-magnetic or void sectors can be arranged in the sequence shown in FIGS. 1(b) and 1(c) and bonded or otherwise adhered to the stator pole pieces 44, 46.

In fact, a number of sets of magnets and voids greater than that disclosed in FIGS. 1(b) and 1(c) can be used. As shown in FIG. 5, three sets of magnets and voids are used with each of the individual magnet and void sectors subtending a 40° arc, with the sequence repeating three times to encompass the whole 360° of the disc 46.

The rotor assembly consists of the rotor shaft 22 and a ferromagnetic rotor disk intermediate the stator pole pieces (and the attached sets of magnets and voids which may be attached to one or both of the stator pole pieces). The rotor disk comprises three equi-angularly spaced 40° sector-shaped ferromagnetic poles 48. Although not shown in FIG. 5, the rotor and stator assemblies include co-operating abutments defining clockwise and counter clockwise limit positions of the rotor assembly relative to the stator assembly.

In FIG. 5, the rotor is shown latched in its clockwise position with each rotor pole partially overlapping a north pole of the permanent magnets bonded to the ferromagnetic pole piece 46 of the actuator. As a result, the counter clockwise edge of each rotor pole 48 overlaps a magnetic void and the magnetically generated torque drives the rotor assembly in a clockwise direction against the abutments. In the counter clockwise limit position of the rotor, each rotor pole 48 partially overlaps a south magnetic pole and the clockwise radial edge of each rotor pole 48 overlies a magnetic void.

With the rotor assembly in the position shown in FIG. 5 appropriate energization of the coil 30 will induce a north pole in the upper disk 26 and south pole in the lower disc 28. The electromagnetically induced flux field will overcome the permanent magnet flux field and produce an opposite, greater torque thus driving the rotor assembly in counter clockwise direction. When the rotor assembly is in its counter clockwise limit position, opposite energization of the coil 30 will return the rotor assembly to its clockwise limit position.

It will be recognized that the stops or abutments are positioned to prevent the rotor assembly of the FIG. 5 construction from rotating to a balanced (zero net torque) position in which the rotor's poles 48 would overlie the junction between the north and south magnets. A second stator disk, similar to the magnets/voids stator disk bonded to the disc 46, could be bonded to the inwardly presented face of the disc 44 to further improve the torque/efficiency of the actuator.

Thus, where the first embodiment mounted the magnets and voids on the rotor, the second embodiment mounts the magnets on the stator portion of the actuator. There may be applications or manufacturing methods which favor one or the other. If an actuator rotational travel of around 100° is desirable, then the simple rotor or stator disk arrangement shown in FIG. 1(b) would be necessary and if greater torque is required, multiple rotors (as in FIG. 6) could be employed.

If rotor torque, without regard to rotor travel, was the critical factor, then the two set (as in FIG. 1(c) or three set (as in FIG. 5) system would be preferred.

Those of ordinary skill in the art will recognize that the present invention utilizes the nonsymmetric placing of the magnets in relation to a ferro-magnetic pole (one of which is located on the output shaft and the other on the stator) to achieve both actuator movement (upon proper energization of the coil) and bi-directional latching. Many modifications and changes to the disclosed invention will be clearly obvious to those of ordinary skill in the art in view of the present specification.

It will be understood that it is desirable but not essential that the various poles can be asymmetrically or symmetrically disposed about the axis of shaft 22. Moreover it is desirable but not essential that the sector angles of stator poles are equal, the sector angles of rotor poles are equal, and the sector angles of the rotor poles are equal to the sector angles of the stator poles.

Additionally, as disclosed above and depending upon the operating rotational angle and/or the torque desired one (see FIGS. 2–5), two or more (see FIGS. 6 & 7) rotors could be used in combination with 1, 2 (FIGS. 2–5), and 3 or more (FIGS. 6 & 7) stator pole pieces. The distribution of magnets and voids on the rotors or the pole pieces could have a variety of configurations including one set (FIGS. 1(b) & 2–4), two sets (FIGS. 1(c) & 6) and three or more sets (FIG. 5). Additionally, a single coil (FIGS. 2–5) or multiple coils (FIG. 7) could be used with energization current and windings in a single direction (FIGS. 2–5) or with one of two coils having one of the energization current and/or the winding in opposing directions (FIG. 7).Thus many variations and embodiments of the present invention will be apparent to those of ordinary skill in the art.

Accordingly, the present invention is limited only by the claims appended hereto.

What is claimed:

1. A bi-directional rotating latching actuator, said actuator comprising:
    an output shaft having an axis of rotation;
    at least one rotor fixedly mounted on said output shaft;
    a magnetically conductive housing in which said output shaft is mounted for rotation;
    at least one stator pole piece fixedly mounted with respect to said housing;
    an abutment limiting rotational movement of said shaft; and
    at least one coil for generating at least one toroidal flux field within said housing, wherein one of said at least one rotor and said at least one stator pole piece has at least one set of arcuately spaced segments, said at least one set of segments including two oppositely polarized permanent magnet segments and one adjacent void segment, and the other of said at least one rotor and said at least one stator pole piece has a circumferentially uneven distribution of flux conductivity with at least one area of greater flux conductivity and at least one area of lesser flux conductivity, where said at least one area of greater flux conductivity generally correspond in number to a number of said void segments, wherein said abutment limits rotational movement to prevent axial alignment between said at least two permanent magnets and said at least one area of greater flux conductivity.

2. The bi-directional rotating latching actuator according to claim 1, wherein said at least one rotor comprises a single rotor.

3. The bi-directional rotating latching actuator according to claim 1, wherein said at least one stator pole piece comprises a single stator pole piece.

4. The bi-directional rotating latching actuator according to claim 1, wherein said at least one coil comprises a single cylindrical coil.

5. The bi-directional rotating latching actuator according to claim 1, wherein said at least one rotor has at least one set of arcuately spaced segments including said at least two permanent magnets and at least one void and said stator pole piece has said uneven distribution of flux conductivity.

6. The bidirectional rotating latching actuator according to claim 5, wherein said at least one set of segments comprises a single set of segments, and each of said segments extends arcuately for about 120°.

7. The bi-directional rotating latching actuator according to claim 5, wherein said at least one pole piece comprises two stator pole pieces, said stator pole pieces disposed axially above and below said rotor.

8. The bi-directional rotating latching actuator according to claim 7, wherein each of said stator pole pieces has an axially thicker area having greater flux conductivity and an axially thinner area having lesser conductivity.

9. The bi-directional rotating latching actuator according to claim 1, wherein said at least one stator pole piece has at least one set of arcuately spaced segments including said at least two permanent magnets and at least one void and said at least one rotor has said uneven distribution of flux conductivity.

10. The bi-directional rotating latching actuator according to claim 9, wherein said rotor is comprised of a ferro-magnetic material and has an area having greater flux conductivity and an area having lesser conductivity.

11. The bi-directional rotating latching actuator according to claim 9, wherein said at least one pole piece comprises two stator pole pieces, said stator pole pieces disposed axially above and below said rotor.

12. The bi-directional rotating latching actuator according to claim 11, wherein each of said stator pole pieces has at least one set of segments and each of said segments extends arcuately for about 120°.

13. The bi-directional rotating latching actuator according to claim 1, wherein said at least one rotor comprises two rotors both axially spaced apart and, fixedly mounted on said output shaft, and said at least one stator pole piece comprises three stator pole pieces, one of said stator pole pieces, an intermediate stator pole piece, is located in said housing axially intermediate said rotors, and the other two stator pole pieces disposed at respective ends of said housing sandwiching said rotors and said intermediate stator pole piece.

14. The bi-directional rotating latching actuator according to claim 13, wherein said at least one coil comprises two coils, each coil having a longitudinal axis coincident with said axis of rotation.

15. A bi-directional rotating latching actuator, said actuator comprising:
    an output shaft having an axis of rotation;
    at least one rotor fixedly mounted on said output shaft, said at least one rotor having at least one set of arcuately spaced segments, said at least one set of segments including two oppositely polarized permanent magnet segments and one adjacent void segment;
    a magnetically conductive housing in which said output shaft is mounted for rotation;
    at least one stator pole piece fixedly mounted with respect to said housing; said at least one stator pole piece having a circumferentially uneven distribution of flux conductivity with at least one area of greater flux conductivity and at least one area of lesser flux conductivity, where said at least one area of greater flux conductivity generally corresponds in number to a number of said void segments, an abutment limiting rotational movement of said shaft; and at least one coil, said at least one coil for generating at least one toroidal flux field within said housing with the direction of the flux field travel being determined by the current flow direction in the at least one coil, wherein said rotor is capable of movement between clockwise and counterclockwise latched positions with said abutment preventing further movement beyond said latched positions, said abutment limits rotational movement to prevent rotor rotation to the point that there is substantial axial alignment between said at least two permanent magnets and said at least one area of greater flux conductivity.

16. A bi-directional rotating latching actuator in accordance with claim 15, wherein said at least one rotor is comprised of a single rotor with a single set of segments, each segment extends arcuately for about 120° and each magnet segment is magnetized to have an internal flux field substantially parallel with the axis of rotation.

17. A bi-directional rotating latching actuator in accordance with claim 15, wherein said at least one stator pole piece comprised of a pair of stator pole pieces closing ends of said housing, each of said stator pole pieces having a single area of greater flux conductivity, said single area comprising an axial thickness of ferromagnetic material greater than any other area on said stator pole piece.

18. A bidirectional rotating latching actuator in accordance with claim 15, wherein:

said at least one coil is comprised of a single cylindrical coil, located in said housing;

said at least one stator pole piece comprised of a pair of stator pole pieces closing ends of said housing, each of said stator pole pieces having a single area of greater flux conductivity, said single area comprising an axial thickness of ferromagnetic material greater than any other area on said stator pole piece; and said at least one rotor is comprised of a single rotor with a single set of segments, each segment extends arcuately for about 120° and each magnet segment is magnetized to have an internal flux field substantially parallel with the axis of rotation.

19. A bi-directional rotating latching actuator in accordance with claim 15, wherein:

said at least one coil is comprised of a single cylindrical coil, located in said housing;

said at least one stator pole piece comprised of a pair of stator pole pieces, each of said stator pole pieces having a single area of greater flux conductivity, said single area comprising an axial thickness of ferromagnetic material greater than any other area on said stator pole piece; and said at least one rotor is comprised of a single rotor with two sets of segments, each segment extends arcuately for about 60° and each magnet segment is magnetized to have an internal flux field substantially parallel with the axis of rotation.

20. A bi-directional rotating latching actuator, said actuator comprising:

an output shaft having an axis of rotation;

at least one rotor comprised of a ferromagnetic material and fixedly mounted on said output shaft, said at least one rotor having a circumferentially uneven distribution of flux conductivity with at least one area of greater flux conductivity comprising at least one segment;

a magnetically conductive housing in which said output shaft is mounted for rotation;

at least one stator pole piece fixedly mounted with respect to said housing; having at least one set of arcuately spaced segments, said at least one set of segments including two oppositely polarized permanent magnet segments and one adjacent void segment, where said at least one area of greater flux conductivity in said rotor generally corresponds in number to a number of said void segments in each stator pole piece, an abutment limiting rotational movement of said shaft; and at least one coil, said at least one coil for generating at least one toroidal flux field within said housing with the direction of the flux field travel being determined by the current flow direction in the at least one coil, wherein said rotor is capable of movement between clockwise and counterclockwise latched positions with said abutment preventing further movement beyond said latched positions, said abutment limits rotational movement to prevent rotor rotation to the point that there is substantial axial alignment between said at least two permanent magnets and said at least one area of greater flux conductivity.

* * * * *